(12) United States Patent
Zaydman et al.

(10) Patent No.: US 10,732,844 B1
(45) Date of Patent: Aug. 4, 2020

(54) GAP MANAGEMENT IN BLOCK STORAGE

(71) Applicant: VMware, Inc., Palo Alto, CA (US)

(72) Inventors: Oleg Zaydman, San Jose, CA (US);
Roman Zhirin, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/280,475

(22) Filed: Feb. 20, 2019

(51) Int. Cl.
G06F 3/06 (2006.01)
(52) U.S. Cl.
CPC .......... *G06F 3/0608* (2013.01); *G06F 3/0644* (2013.01); *G06F 3/0689* (2013.01)
(58) Field of Classification Search
CPC .................................................... G06F 12/023
See application file for complete search history.

(56) References Cited

U.S. PATENT DOCUMENTS 6,618,793 B2 * 9/2003 Rozario ................ G06F 12/023
711/100
7,610,468 B2 * 10/2009 Madisetti .............. G06F 12/023
711/171

* cited by examiner

*Primary Examiner* — Gary W. Cygiel

(57) ABSTRACT

The disclosure enables management of block storage more efficiently than with traditional free space bitmap approaches. An exemplary method includes segregating disk gap indices by differentiated gap sizes; maintaining a set of lists for segregated sizes, such that each list identifies gaps of a common size; comparing a length of a list with trigger criteria, and based at least on the length of the list meeting the criteria, writing at least a portion of the list into a disk gap. Writing gap locations into gaps in disk storage reduces memory burdens, and the gap data can later be extracted when the list becomes short. These processes can be performed iteratively. The prior need for traversing a free space bitmap to find a gap of a particular size is eliminated; the new method permits more rapid location of a particular size gap by selecting an element of the proper list.

20 Claims, 13 Drawing Sheets

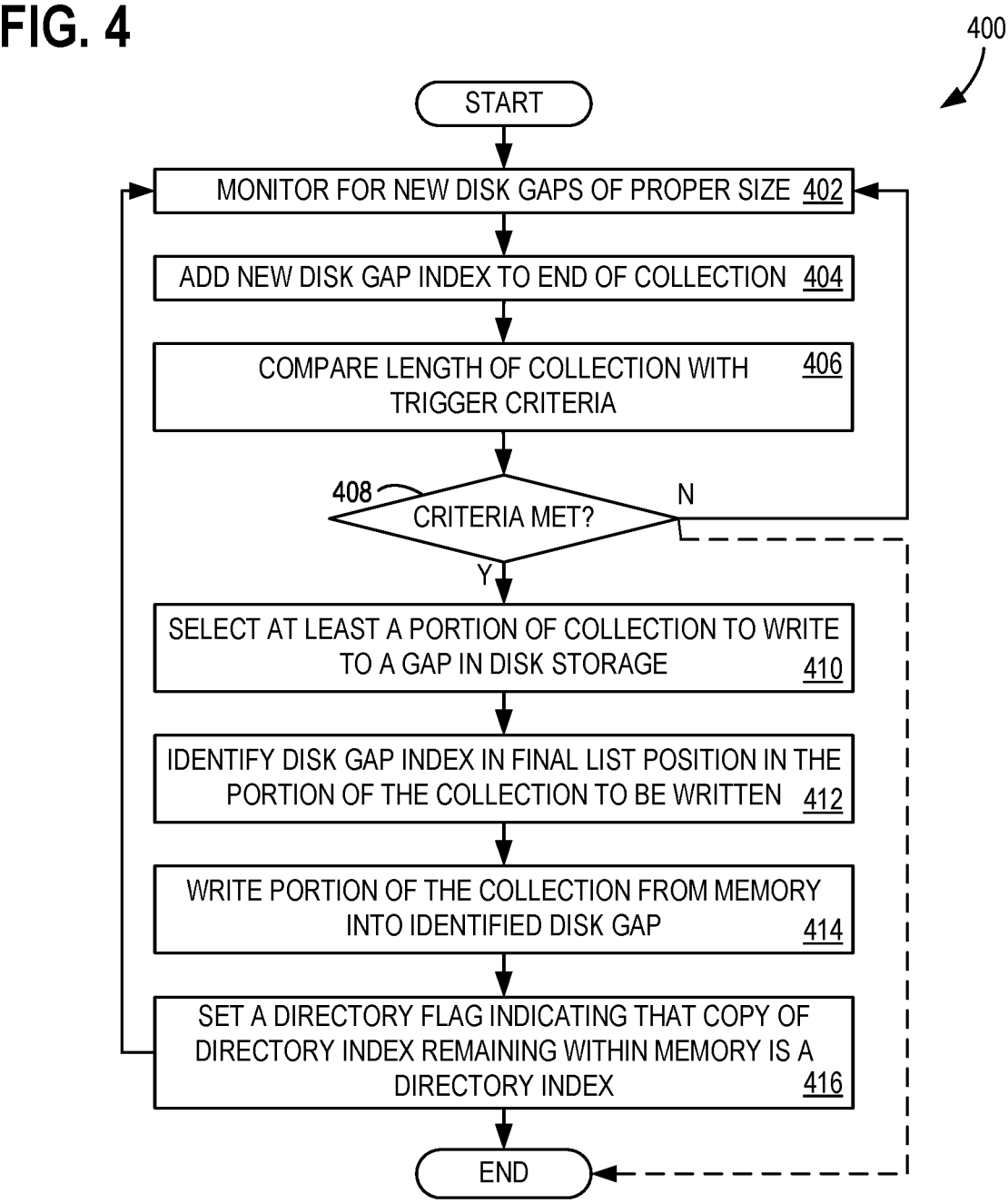

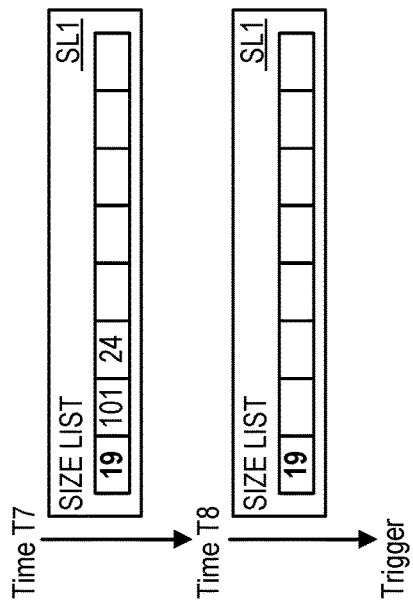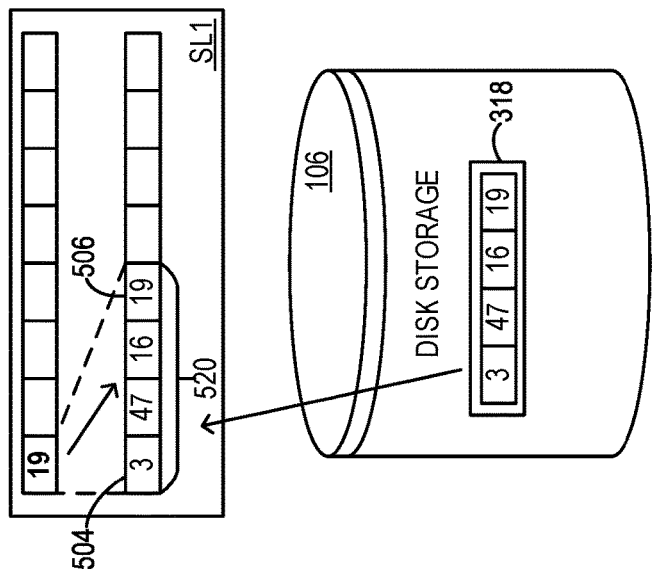
FIG. 5A
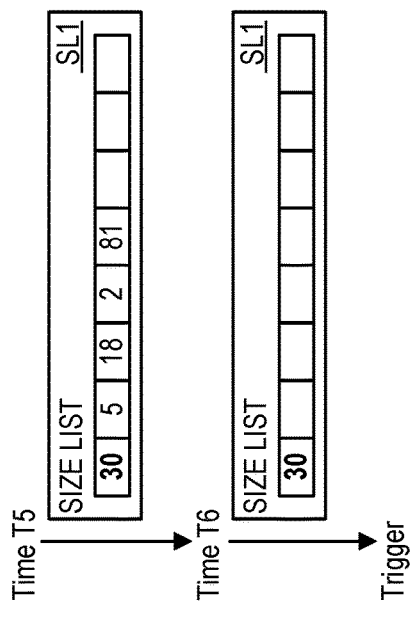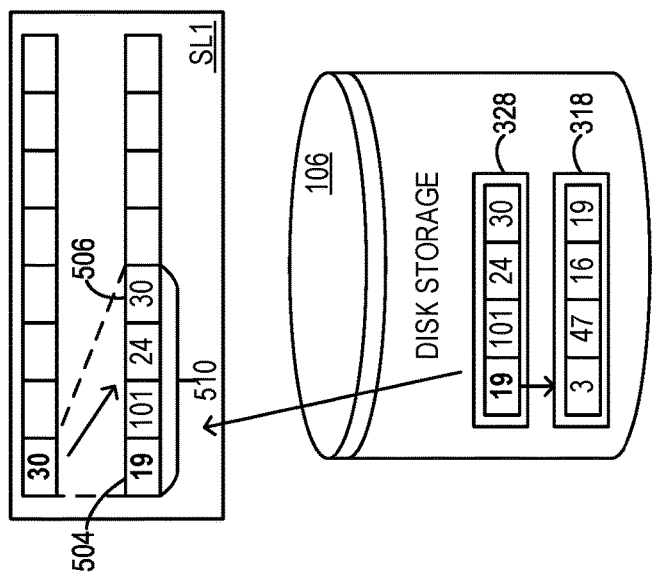
FIG. 5B

GAP MANAGEMENT IN BLOCK STORAGE

BACKGROUND

Block storage is a common method of managing storage on disk drives, in which a minimum unit of storage is a fixed-size block. When using block storage to store files, a single file typically occupies multiple blocks. When files are deleted, this creates gaps in block storage. It is often beneficial to be able to easily find gaps of a given size, for example, when adding a new file of a given size to block storage. One way to manage gaps in disk storage is to use a free space bitmap, a bit array in which the bits indicate whether the corresponding block is available or unavailable. For example, a 4 GB disk with 4096 byte sectors would require 1,048,576 bits for the free space bitmap.

Using the free space bitmap approach, finding a gap of a particular size requires traversing the bitmap until a gap of a particular size is located. When the disk is nearly empty, this approach works well in some systems, but becomes inefficient when the disk is nearly full. Thus, for systems that typically operate at nearly-full capacity for any significant time, a more efficient approach is desirable.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An exemplary method of gap management in block storage comprises: in a memory, segregating disk gap indices by differentiated gap sizes; maintaining a set of collections for the differentiated gap sizes, such that each collection identifies, by indices, disk gaps of a common size; and managing a first collection of the set of collections by: comparing a length of the first collection with a first trigger criteria; and based at least on the length of the first collection meeting the first trigger criteria, writing at least a portion of the first collection from the memory into a disk gap.

BRIEF DESCRIPTION OF THE DRAWINGS

The present description will be better understood from the following detailed description read in the light of the accompanying drawings, wherein:

FIG. 4 illustrates a flowchart corresponding to the activity indicated in FIGS. 3A and 3B;

FIGS. 5A and 5B illustrate retrieving gap data from disk storage with an exemplary iterative scheme that may be used with the architecture of FIG. 1;

DETAILED DESCRIPTION

Figure 1:
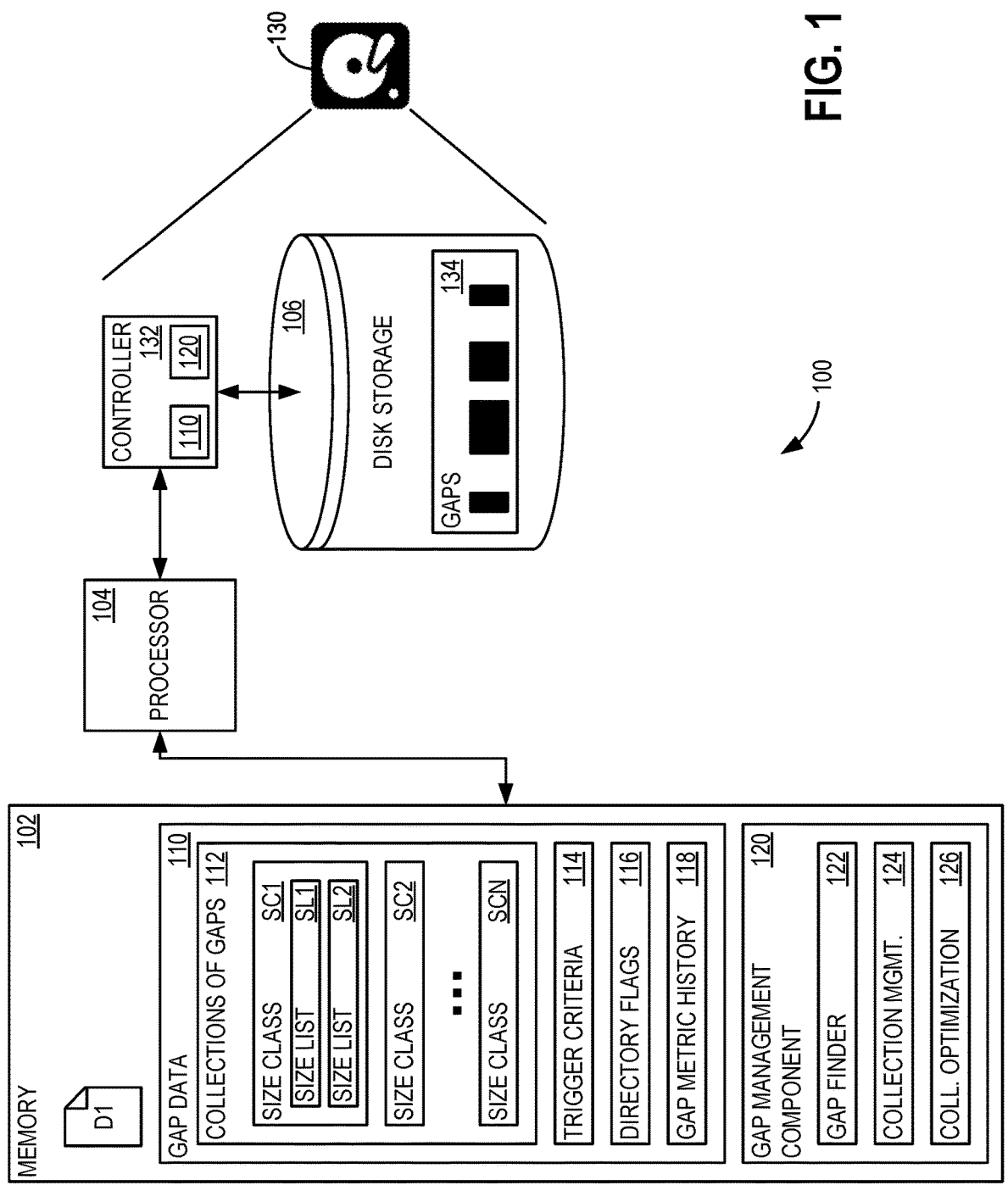
FIG. 1 illustrates a block diagram of an example architecture for gap management in block storage.

Various aspects of the systems and methods described herein provide for management of block storage more efficiently than with traditional free space bitmap approaches. When items are removed (e.g., deleted) from disk storage, a gap is created of a certain size. Ideally, later incoming items can be placed into correctly-sized gaps which have sufficient capacity, but do not waste disk space. If a single list of gaps is used, such as may be created by parsing through a free space bitmap, then finding a gap of a particular size requires traversing the list. In contrast, the disclosure uses separate lists, sorted and segregated by size to find a gap of a certain size. For example, the first item of a list of gaps can be used (although the disclosure is operable to use any item from the list, using any selection criteria). As such, the disclosure offers potentially significant speed advantages.

In the disclosure, fixed-size self-tuning arrays (e.g., lists) are used for each size or size class of gaps (a "collection"). A set of iterative operations move disk gap information between memory and disk storage, as the collections grow and shrink. Each gap is identified by index, which may be a pointer, offset, or block address. When a collection grows too long (e.g., when the array is either full or close to full for its allocated space), a number of gap indices are written into a disk gap and an indication of that disk gap is flagged as a directory index. This frees up memory, such as random access memory (RAM), until the collection has shrunk enough to retrieve the disk gap indices back into memory.

An exemplary method includes segregating disk gap indices by differentiated gap sizes; maintaining a set of lists for segregated sizes, such that each list identifies gaps of a common size; comparing a length of a list with trigger criteria, and based at least on the length of the list meeting the criteria, writing at least a portion of the list into a disk gap. Writing gap locations into gaps in disk storage reduces memory burdens, and the disk gap data can later be extracted when the list becomes short. These processes can be performed iteratively. The prior need for traversing a free space bitmap to find a gap of a particular size is eliminated; the present disclosure permits more rapid location of a particular size gap by selecting the first element of the proper list. The result is fast and memory-efficient management of gaps (free space) in block storage.

Some example systems use 4 KB blocks and manage hundreds of or even thousands of gaps. After disk gaps are segregated into sizes and placed into respective lists, such that each list identifies, by indices, disk gaps of a common size, then when any list becomes too large (according to some trigger criteria), at least a portion of that list is written from memory into a disk gap. When a disk gap is used to store other gap information, the reference to that disk gap that remains in memory (e.g., a copy of the disk gap index remaining within the memory) is flagged as a directory index. This prevents use of that disk gap until after the disk gap information is retrieved from it. Typically, each 4 KB block can store up to approximately 500 disk gap index entries. An example trigger criteria for moving disk gap indices from memory into the disk gaps is when the list contains 128 entries. Other criteria could be when the allocated space in memory (for the particular collection) reaches a threshold level.

Then, when the list shrinks sufficiently (e.g., according to another criteria), the disk gap indices are read from the disk gap back into the list in memory and the directory index flag is cleared to permit using that disk gap for storing data. The lists in this example scheme are thus first-in-last-out (FILO), and can go down to zero length when no more gaps of a certain size remain. Some examples use a first-in-first-out (FIFO) scheme, and other examples may use a combination or another ordering scheme. Some examples use size classes, which are contiguous sets of size lists. For example, one size class may be sizes 1-10, and another size class may be sizes 11-20. In general, the management of gaps is performed on sets of collections for the segregated sizes, where a collection is either a single list for a particular size, or a size class. In some examples, gaps can range in size from 1 through 256, and the use of size classes reduces the number of collections to be managed.

The advantageous operations have application to teleportation, deduplication, and general management of block storage solutions. Deduplication is a technique for eliminating duplicate copies of repeating data, and is used to improve storage utilization and network data transfers by reducing the number of bytes that must be stored or sent. As duplicate chunks of data are identified, the redundant chunks are replaced with a smaller reference that points to the stored chunk, thereby resulting in deletion of data (and the creation of disk gaps). The operations may be performed on a disk module that includes disk storage and a controller, as well as on a separate machine that has access to and is managing the disk storage.

It should be understood that any of the examples herein are non-limiting. As such, the present disclosure is not limited to any particular embodiments, aspects, concepts, structures, functionalities or examples described herein. Rather, the present disclosure may be used in various ways that provide benefits and advantages in computing systems including virtualized computing environments.

FIG. 1 illustrates a block diagram of an example architecture 100 for gap management in block storage. Architecture 100 includes a memory 102, a processor 104, and a disk storage 106. Memory 102 and processor 104 together form a computing node, for example, at least part of a computing device 1100, which is described in further detail in relation to FIG. 11. Disk storage 106, along with a disk controller 132, together form at least a part of a disk module 130. Disk module 130 may be a stand-alone disk drive, or integrated into the same computing device as memory 102 and processor 104. That is, in some examples, memory 102, processor 104, and disk storage 106 are all within a common node, and in some examples, memory 102 and disk storage 106 are located in separate nodes remote from each other.

As illustrated, disk storage 106 has gaps 134 that are to be managed to obtain desirable performance from disk storage 106. In some examples, gaps 134 are identified when disk module 130 is mounted. In some examples, gaps 134 are also identified (by index) when a disk operation occurs that changes the amount of free space on disk storage 106. Memory 102 contains a document D1 that is awaiting writing to disk storage 106. A gap data 110 contains information useful in the management of gaps 134 and a gap management component 120. Processor 104 operates on gap management component 120 to perform operations described herein, in some examples. In some examples, disk controller 132 has its own version of gap data 110 and gap management component 120, which is operated upon by a processor on-board disk controller 132 so that capabilities described herein can be performed within disk module 130 as a stand-alone unit.

Gap data 110 includes a set of collections 112 for segregated sizes of gaps. For example, three size classes SC1, SC2, and SCN are shown. As illustrated, size class SC1 contains two size lists SL1 and SL2. It should be understood that, in general, any collection within set of collections 112 may include either only size lists or size classes that, in turn, hold size lists for consecutive sizes. Thus, a collection may comprise a size class that includes a plurality of size lists. Gap data 110 also includes trigger criteria 114 for determining when to move disk gap indices from memory 102 into gaps 134 in disk storage 106, and back out of disk storage 106 into memory 102. A set of directory flags 116 in gap data 110 is used to identify which disk gap indices within memory 102 and disk storage 106 are acting as directory indices for gaps holding gap data. Additionally, a gap metric history 118 is collected and stored for use in optimizing gap management operations, as described below.

In gap management component 120, a gap finder 122 identifies gaps 134 and passes the information to a collection management module 124 that segregates disk gap indices by gap sizes in memory 102. The different size lists are maintained within set of collections 112, such that each collection identifies, by indices, disk gaps of a common size. Collection management module 124 then further manages collections in set of collections 112. A collection optimization module 126 uses gap metric history 118 to optimize gap management operations. For example, metrics can be stored on which gap sizes are most prevalent. Then, memory allocation for fixed array sizes for storing gap information can be customized based on expected list length. Gap sizes that tend to be more prevalent can be allocated more memory (longer capacity lists), and the trigger criteria adjusted accordingly, to balance how often gap data is written to disk storage 106 for the different lists (or collections).

Figure 2:
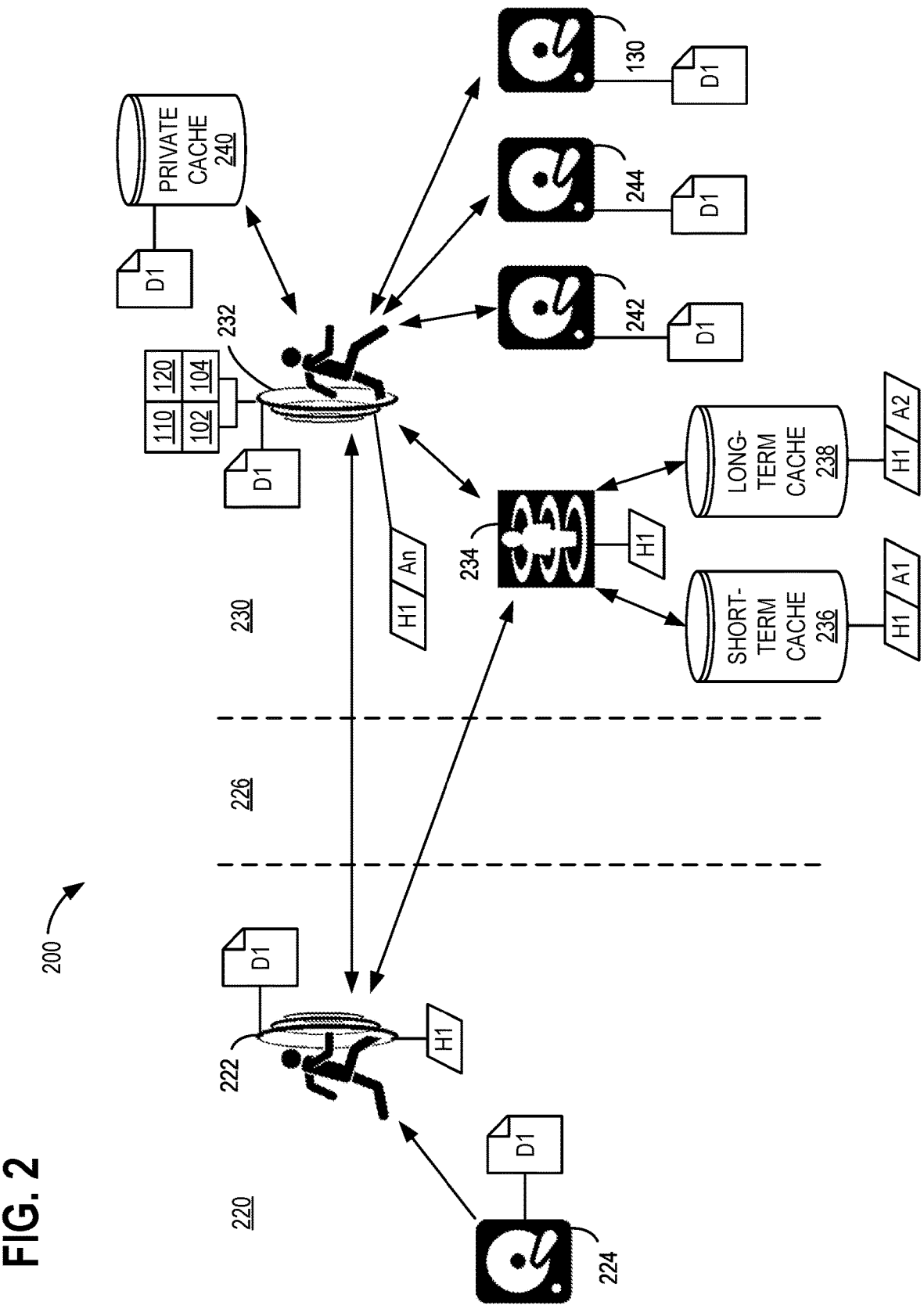
FIG. 2 illustrates an example teleportation architecture that advantageously uses gap management in block storage.

FIG. 2 illustrates an example teleportation architecture 200 that advantageously uses gap management in block storage. Architecture 200 comprises a source node 220, a network 226, and a destination node 230. Coherence is to be maintained between source node 220 and destination node 230; the example of transmitting document D1 from source node 220 to destination node 230 is used for exemplary explanation of the operation of architecture 200. Source node 220 has a source endpoint 222 and source storage location 224. Destination node 230 has a destination endpoint 232, a first destination storage location 242, a second destination storage location 244, a private cache 240, and a teleporter 234, all coupled to destination endpoint 232. A third destination storage location is identified as disk module 130. In some examples, one or more of storage locations 224, 242, and 244 are also other manifestations of disk module 130.

Destination node 230 further has a short-term cache 236 and a long-term cache 238, both coupled to teleporter 234. Teleporter 234 is configured to indicate a cache hit to destination endpoint 232. Destination endpoint 232 is configured to, based at least on receiving an indication of a cache hit from teleporter 234, check cache coherence and possibly use a local copy of D1. Destination endpoint 232 is further configured to, based at least on detecting a lack of coherence or no local copy of D1, request D1 from source endpoint 222.

In operation, document D1 in source storage location 224 is selected to be transmitted to destination node 230 over network 226 using source endpoint 222. Source endpoint 222 hashes document D1 to generate a data hash value H1, and transmit it to teleporter 234 over network 226. Teleporter 234 receives data hash value H1 and searches within short-term cache 236 and possibly also within long-term cache 238 for data hash value H1 and a matching block address A1 or A2. If teleporter 234 cannot find data hash value H1 or the cached copy of document D1 is not coherent (e.g., it has a different hash value), document D1 is requested from source endpoint 222. Source endpoint 222 then transmits document D1 to destination endpoint 232. Destination endpoint 232 then copies document D1, received from source endpoint 222, to one of the destination storage locations indicated (destination storage location 242 or 244, or disk module 130). If, however, teleporter 234 can find a coherent copy of document D1 in a local cache, then document D1 is requested from the proper location, block address A1 or A2.

The moving of document D1 includes deletion operations, which create gaps in disk storage locations. Therefore, architecture 200 can advantageously use the disclosed gap management in block storage for separate nodes (e.g., any of the destination storage locations) during teleportation operations. Thus, as illustrated, destination endpoint 232 includes copies of both gap data 110 and gap management component 120 in memory 102 and processor 104 to execute the instructions.

Figure 3B:
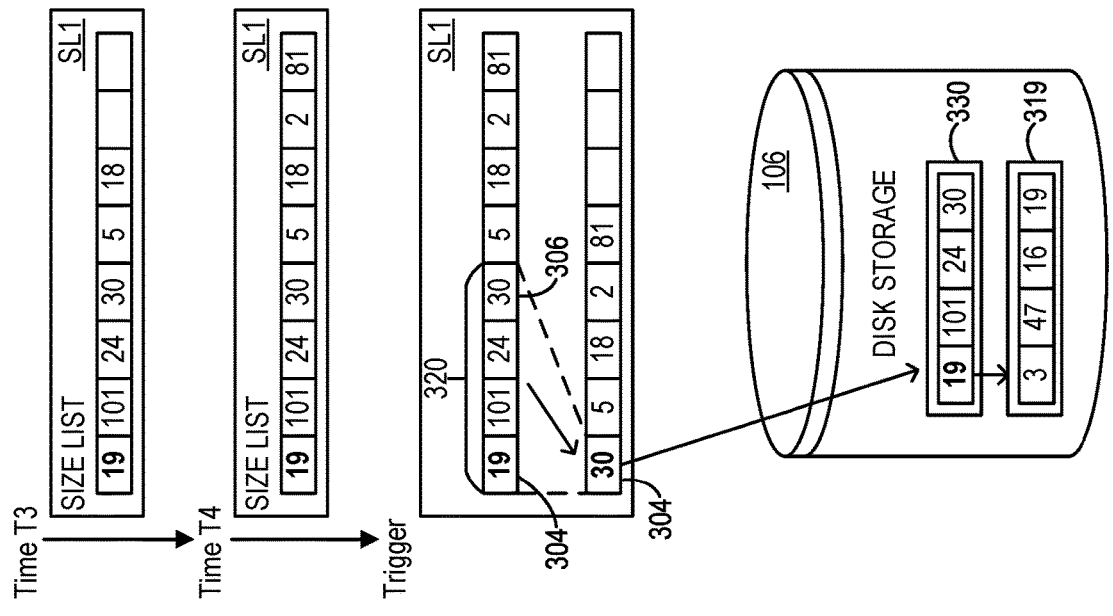
FIGS. 3A and 3B illustrate saving gap data in disk storage with an exemplary iterative scheme that may be used with the architecture of FIG. 1.
Figure 3A:
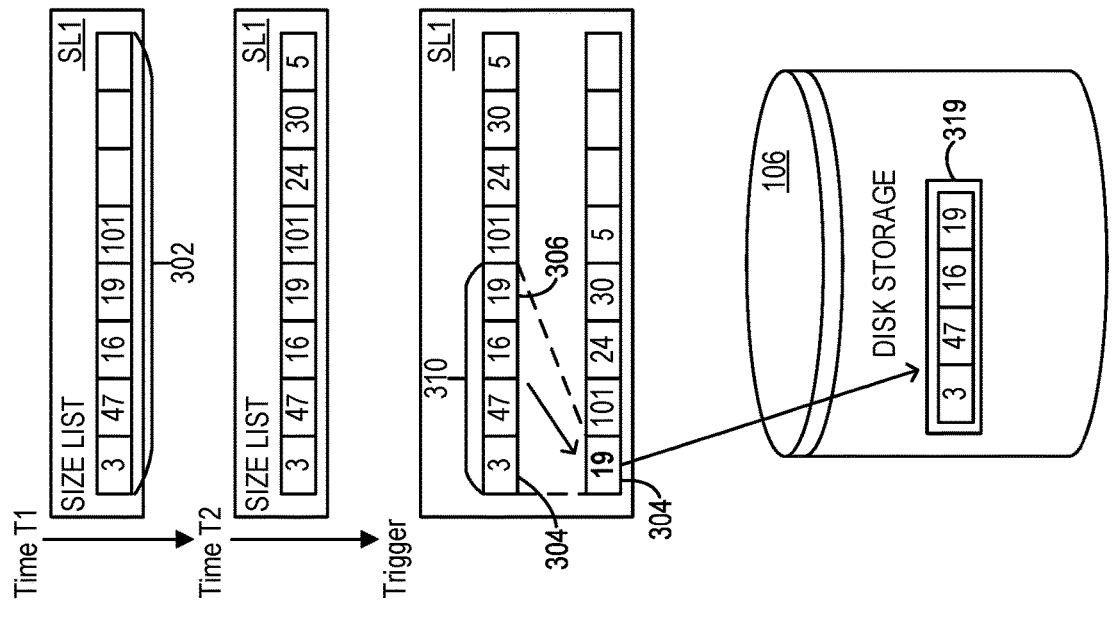

FIGS. 3A and 3B illustrate saving gap data in disk storage with an exemplary iterative scheme that may be used with the architecture of FIG. 1. In FIGS. 3A and 3B, a size list SL1 (which is in memory 102) is shown as growing and then being partially saved to disk storage 106 at various times T1, T2, T3, and finally T4. Initially SL1 is allocated with the eight memory spaces shown in array 302, although it should be understood that an operational example could have hundreds of spaces allocated. As illustrated, size list SL1 contains a list of disk gap indices of all the same size. In FIG. 3A, at time T1, size list SL1 contains a list of disk gap indices {3, 47, 16, 19, 101}. At a later time, T2, as data has been deleted from disk storage 106, new gaps had been created that were added at the end of size list SL1, which now contains a list of disk gap indices {3, 47, 16, 19, 101, 24, 30, 5}. This longer list meets trigger criteria for writing at least a portion of size list SL1 from memory 102 into a disk gap in disk storage 106.

The first four elements in size list SL1, {3, 47, 16, 19} are the portion that is to be written. The disk gap into which the portion of size list SL1 is to be written is identified by the disk gap index that is in the final list position 314 within the portion {3, 47, 16, 19}. If the portion 310 of size list SL1 that is to be written to disk storage 106 is less than the entirety of size list SL1, then the final list position 306 within the portion will not be the final position of size list SL1, but will instead be somewhere interior to size list SL1. The disk gap where the portion of size list SL1 is written is a disk gap identified with an index 19. Thus, disk gap 19 is no longer devoid of meaningful information. So, to avoid disk gap 19 being used prior to the written portion {3, 47, 16, 19} being retrieved back into memory, disk gap index 19 is retained in an initial list position 304 of size list SL1, and a directory flag is set to indicate that the copy of index 19 remaining within memory 102 is a directory index. Size list SL1 now contains a list of disk gap indices {19, 101, 24, 30, 5}, of which the initial list position is a directory index. Disk storage 106 now holds {3, 47, 16, 19} in disk gap 19, which is identified by element number 319.

In FIG. 3B, at time T3, size list SL1 contains a list of disk gap indices {19, 101, 24, 30, 5, 18}. At a later time, T4, as more data has been deleted from disk storage, new gaps had been created that were added at the end of size list SL1, which now contains a list of disk gap indices {19, 101, 24, 30, 5, 18, 2, 81}. This longer list meets trigger criteria for writing at least a portion of size list SL1 from memory into a disk gap in disk storage, in an example. The first four elements in size list SL1, {19, 101, 24, 30} are the portion that is to be written. The disk gap into which the portion 320 of size list SL1 is to be written is identified by the disk gap index that is in the final list position 306 within the portion {19, 101, 24, 30}. The portion of the collection that is to written includes a directory index (gap index 19), that had been set with the earlier write process. Specifically, the directory index is in an initial list position within the portion of the collection that is to be written.

The disk gap where the portion of size list SL1 is written is a disk gap identified with an index 30. Thus, disk gap 30 is no longer devoid of meaningful information. So, to avoid disk gap 30 being used prior to the written portion {19, 101, 24, 30} being retrieved back into memory, disk gap index 30 is retained in an initial list position 304 of size list SL1, and a directory flag is set to indicate that the copy of index 30 remaining within memory 102 is a directory index. Size list SL1 now contains a list of disk gap indices {30, 5, 18, 2, 81}, of which the initial list position is a directory index. Disk storage 106 now holds {3, 47, 16, 19} in disk gap 19, which is identified by element number 319 and {19, 101, 24, 30} in disk gap 30, which is identified by element number 330.

FIG. 4 illustrates a flowchart 400 corresponding to the activity indicated in FIGS. 3A and 3B. In operation 402, collection management module 124 monitors for new disk gaps of the proper size to add to the collection (e.g., size list SL1). When a new disk gap index is to be added to the collection, operation 404 adds the new disk gap index to the end of the collection, growing the length of the list. Operation 406 includes comparing the length of the collection with the trigger criteria for writing disk gap indices to disk storage. If the collection is not yet long enough, as determined in decision operation 408, flowchart 400 returns to monitoring in operation 402. Based at least on the length of the collection meeting that trigger criteria, however, operation 410 selects at least a portion of the collection to write to a gap in the disk storage. Operation 412 identifies a disk gap index within the portion of the collection that is to be written, specifically, the disk gap index that is in the final list position within the portion of the collection that is to be written. Operation 414 then includes writing the portion of the collection from the memory into the disk gap. Operation 416 retains a copy of the disk gap index within the memory and sets a directory flag indicating that the copy of the disk gap index remaining within the memory comprises a directory index.

Flowchart 400 is performed iteratively, so that the portion that is written as shown in FIG. 3B includes a directory index pointing to the portion that is written as shown in FIG. 3A. In some examples, flowchart 400 operates in an ongoing loop. In some examples, however, flowchart 400 is used for only a single pass. In such examples, a "No" result in decision operation 408 does not return to operation 402, nor does operation 416 return to operation 402. Instead, flowchart 400 merely ends (e.g., see dashed line from operation 408 to the end of flowchart 400).

FIGS. 5A and 5B illustrate retrieving gap data from disk storage with an exemplary iterative scheme that may be used with the architecture of FIG. 1. Specifically, FIGS. 5A and 5B show an unwrapping of the storage process illustrated in FIGS. 3A and 3B, as size list SL1 is shown as shrinking and being retrieved from disk storage back into memory at various times T5, T6, T7, and finally T8. In FIG. 5A, at time T5, size list SL1 contains a list 510 of disk gap indices {30, 5, 18, 2, 81} (spanning up through position 506), of which the initial list position 504 (containing disk gap index 30) is a directory index. At a later time, T6, as data has been added to disk storage, gaps had been filled and their corresponding indices were removed from the end of size list SL1, which now contains a list of disk gap indices {30}—just a single index. This shorter list meets trigger criteria for reading disk gap indices from a disk gap into the collection in memory, in an example. It should be understood that some examples may use trigger criteria that begins reading from memory when a size list is longer than just a single element.

Disk gap indices are read from the identified disk gap (e.g., using the directory index in initial position 504) into the collection in memory, and the directory flag corresponding to that gap index is cleared. What had been the directory index is now just a disk gap index in the final position 504 of the portion that is read. As illustrated, four elements are added to the read portion 510, and added to size list SL1, which are {19, 101, 24, 30}. The disk gap indices that are read from the disk gap (portion 510) include a directory index in the initial list position 504, which is identified as disk gap index 19.

In FIG. 5B, at time T7, size list SL1 has shrunk further and contains a list 520 of disk gap indices {19, 101, 24}. At a later time, T8, as even more gaps have been removed from disk storage, size list SL1 now contains only {19}. This meets trigger criteria reading disk gap indices from a disk gap into the collection in memory. Disk gap index 19 is a directory index, because the corresponding directory flag is set. Thus, disk gap 19 is not yet to be used for data, but is instead to be used to unpack the disk gap list. Disk gap indices are read from the identified disk gap (using the directory index in initial position 504) into the collection in memory, and the directory flag corresponding to that gap index is cleared. As illustrated, four elements are added to the read portion 510, and added to size list SL1, which are {3, 47, 16, 19}.

Figure 6:
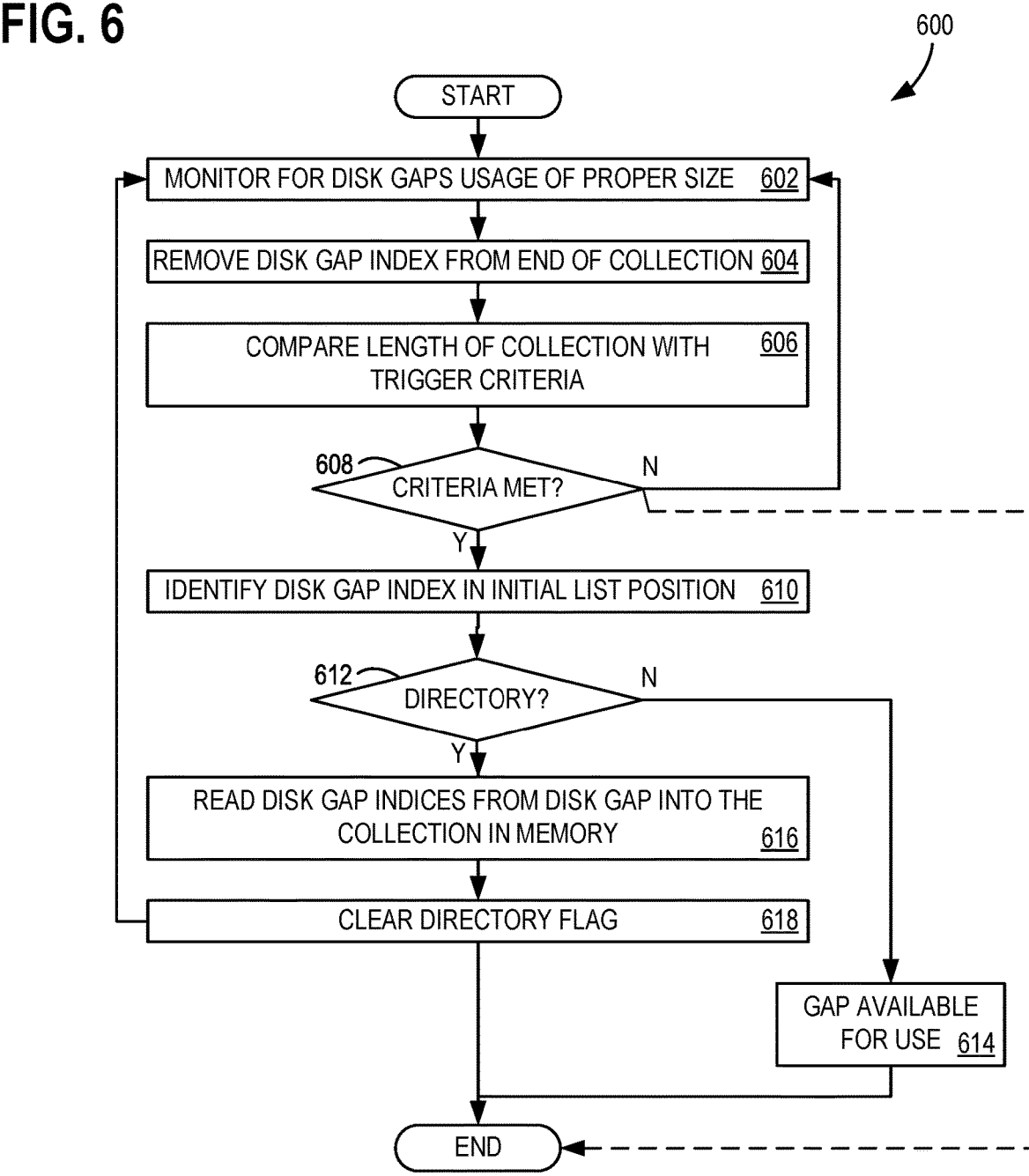
FIG. 6 illustrates a flowchart corresponding to the activity indicated in FIGS. 5A and 5B.

FIG. 6 illustrates a flowchart 600 corresponding to the activity indicated in FIGS. 5A and 5B. In operation 602, collection management module 124 monitors for usage of disk gaps of the proper size to remove from the collection (e.g., size list SL1). When a disk gap index is to be removed from the collection, operation 604 removes the disk gap index from the end of the collection, reducing the length of the list. Operation 606 includes comparing the length of the collection with the trigger criteria for reading disk gap indices from a disk gap into the collection in the memory. If the collection is not yet short enough, as determined in decision operation 608, flowchart 600 returns to monitoring in operation 602. Based at least on the length of the collection meeting that trigger criteria, however, operation 610 identifies the disk gap index in the initial list position and checks to determine whether the corresponding directory flag is set, in operation 612. If the disk gap index in the initial list position is not a directory index, then the corresponding disk gap is ready for use (e.g., filling with data), as indicated in box 614. If, however, the disk gap index in the initial list position is a directory index, then operation 616 includes reading disk gap indices from the disk gap into the collection in the memory. Operation 618 then clears the directory flag for that disk gap index.

Flowchart 600 is performed iteratively, so that the portion that is read as shown in FIG. 5A includes a directory index pointing to the portion that is read as shown in FIG. 5B. In some examples, flowchart 600 operates in an ongoing loop. In some examples, however, flowchart 600 is used for only a single pass. In such examples, a "No" result in decision operation 608 does not return to operation 602, nor does operation 4618 return to operation 602. Instead, flowchart 600 merely ends (e.g., see dashed line from operation 608 to the end of flowchart 600).

Figure 7:
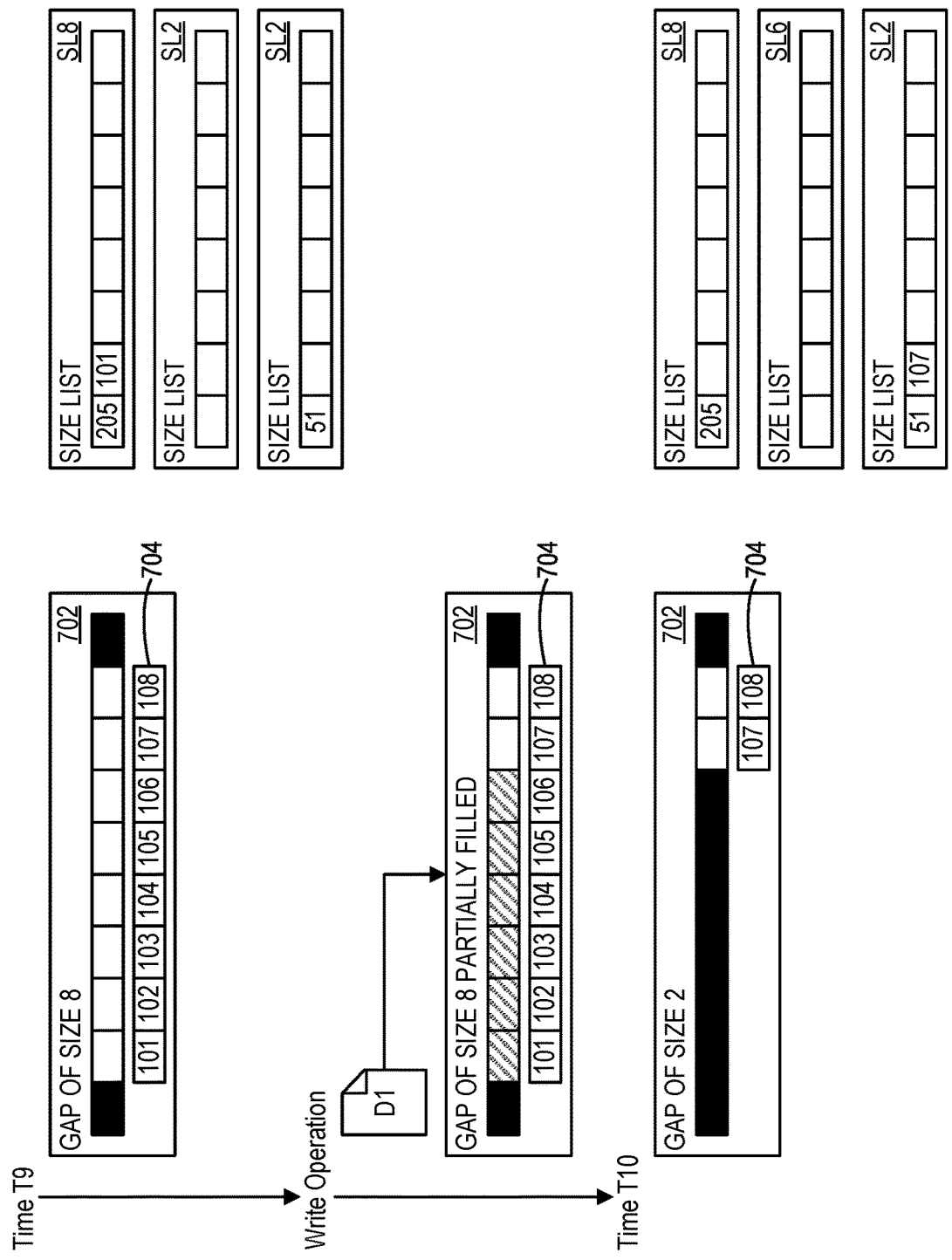
FIG. 7 illustrates saving data into a gap and managing the remaining gap, according to an example embodiment.

FIG. 7 illustrates saving data into a gap and managing the remaining gap, according to an example embodiment. The illustrated example shows snapshots at various times T9 and T10, with an intervening write operation. At time T9 a gap of size 8, indicated as element 702, is shown with empty disk blocks corresponding to disk indices 101-108 in an index list 704. It should be understood that index list 704 is only for labeling purposes, and does not represent blocks. The black, filled-in blocks indicated in FIG. 7, spanning the eight empty blocks, indicated used blocks. At time T9, a size list SL8, indicating gaps of size eight blocks, contains two disk gap index entries {205, 101}. The entry "101" matches the left-most index of an index list 704. Also at time T9, a size list SL2, indicating gaps of size two blocks, contains a single disk gap index entry {51}, and a size list SL6, indicating gaps of size six blocks, is empty.

As indicated in FIG. 7, a write operation commences after time T9. Document D1 is to be written to disk storage and will occupy six blocks. The ideal solution is to find a gap of six blocks. However, size list SL6 is empty. Gaps of size seven blocks will be considered for use, but if none exist, then gaps of size 8 will be considered. In this example, size list SL8 indicates that there is an available gap of size eight. Since the collections (e.g., size lists and size classes) are FILO, the disk gap that is first for use is the one at the end of size list SL8. This is disk gap index 101. Thus, document D1 is written into six of the eight empty blocks, specifically blocks 101-106, partially filling the 8-block disk gap. This operation leaves a gap of two blocks. Therefore, disk gap index 101 is removed from the end of size list SL8 and disk gap index 107 is added to the end of size list SL2.

Figure 8:
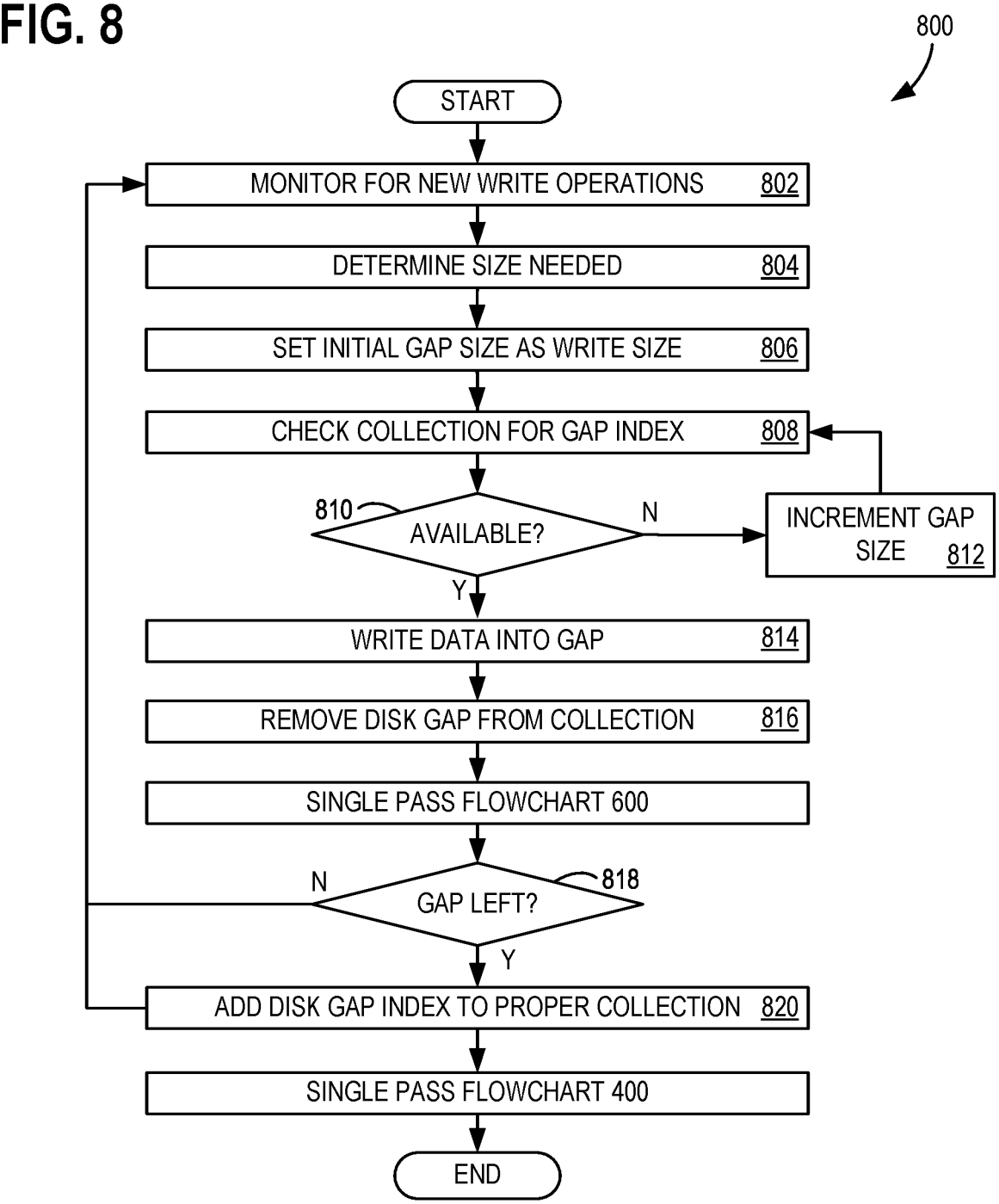
FIG. 8 illustrates a flowchart corresponding to the activity indicated in FIG. 7.

FIG. 8 illustrates a flowchart 800 corresponding to the activity indicated in FIG. 7. Operation 802 monitors for new write operations. When one occurs, operation 804 determines the size of disk storage, measured in the number of blocks that are needed. Operation 806 sets the initial disk gap size to seek as the same size as is needed for writing, as this will make efficient use of the disk gap space. Operation 808 checks availability, by examining the corresponding collection for any available disk gap indices. If there are none, as indicated in decision operation 810, operation 812 increments the gap size to seek and flowchart 800 returns to operation 808.

When an available disk gap is found, operation 814 writes the data into the disk gap and operation 816 deletes the disk index from the collection in which it was found. A single pass of flowchart 600 is then performed (see FIG. 6). Decision operation 818 determines whether there is any remaining gap. This occurs when the disk gap into which the data is written is larger than is needed for the data. If there is no remaining gap, flowchart 800 returns to operation 802. If, however, there is a remaining gap, operation 820 adds the proper disk gap index to the proper collection. A single pass of flowchart 400 is performed (see FIG. 4), and then flowchart 800 returns to operation 802.

Figure 9:
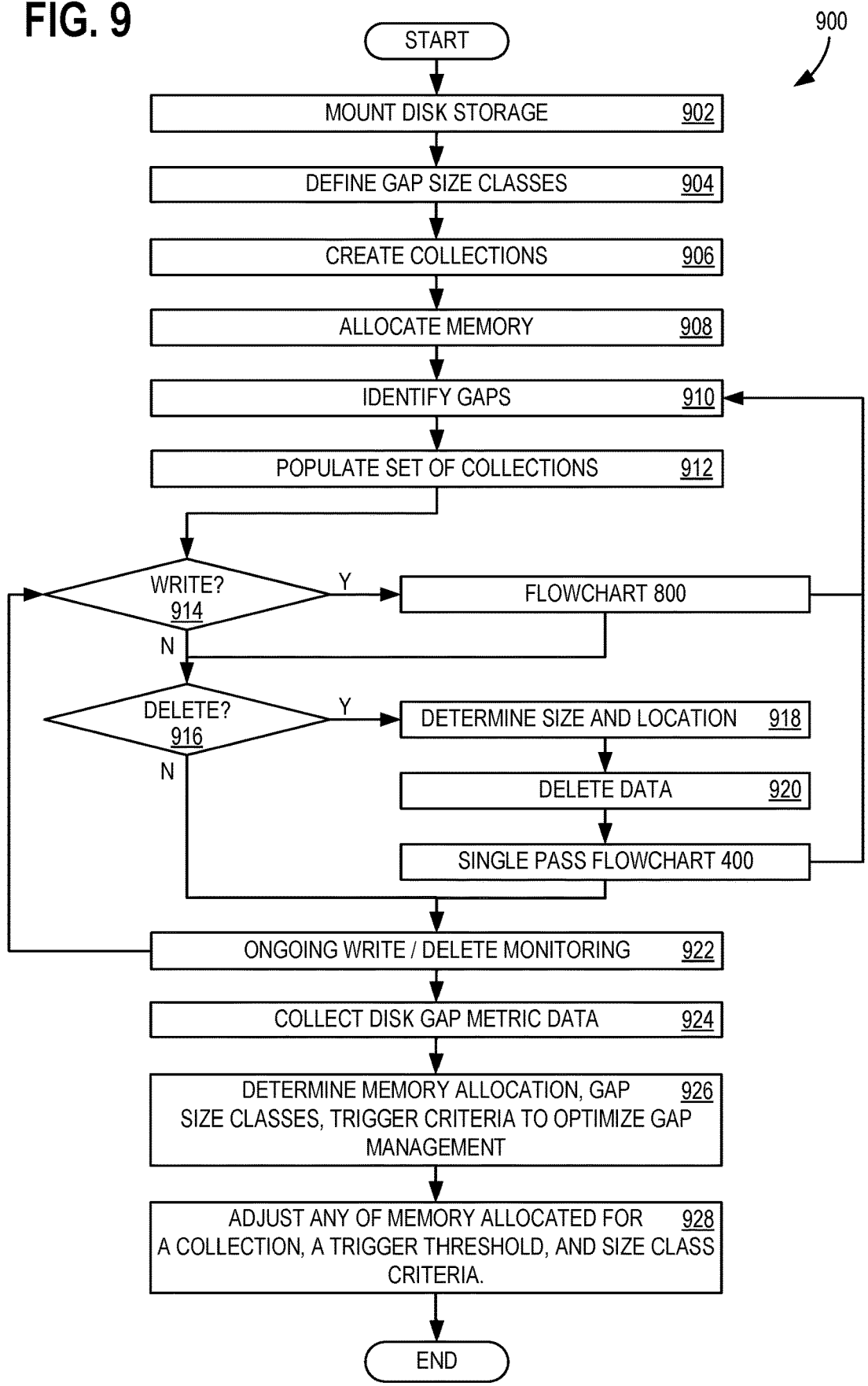
FIG. 9 illustrates a flowchart showing a method of gap management in block storage, according to an example embodiment that may be used with the architecture of FIG. 1.

FIG. 9 illustrates a flowchart 900 showing a method of gap management in block storage, according to an example embodiment that may be used with the architecture of FIG. 1. Disk storage is mounted in operation 902, perhaps resulting from connecting disk module 130 to computing device 1100 (see FIGS. 1 and 11). Gap size classes are defined in operation 904, for example by using default values or by using optimized class size criteria from a prior iteration of operation 926 (as described below). A set of collections is created, such as a set of size lists or size classes, in operation 906 and memory is allocated for each of the collections in the set of collections in operation 908. Disk gaps are identified in operation 910, and the data is used to populate the set of collections in operation 912.

When decision operation 914 detects an incoming write operation, flowchart 900 invokes flowchart 800 to write the data and manage the gaps (using flowcharts 400 and 600). In some examples, flowchart 900 returns to operation 910. In some examples, flowchart 900 moves on to monitoring for deletions. In decision operation 916, if there is a data deletion, operation 918 determines where it will occur and how many blocks are affected. The data is deleted in operation 920, and flowchart 900 invokes flowchart 400 to update the disk gap information in the set of collections. In some examples, flowchart 900 returns to operation 910. In some examples, flowchart 900 moves on to ongoing monitoring for further writes and deletions, in operation 922.

As the disk gap indices are moved in and out of the set of collections and disk gaps, metric data can be collected. Operation 924 includes collecting disk gap metric data. Operation 926 is an optimization operation, performed by collection optimization module 126 of FIG. 1. In some examples, operation 928 includes adjusting at least one parameter selected from the list consisting of memory allocated for a collection, trigger criteria, and size class criteria. The adjusted parameters are used the next time an iteration of flowchart 900 engages in operations 904-908. Although many of the examples described thus far explain the operations for managing a particular size gaps (e.g., a first collection of the set of collections), it should be understood that the operations also are able to managing a second collection of the set of collections (and more) in accordance with managing the first collection.

Figure 10A:
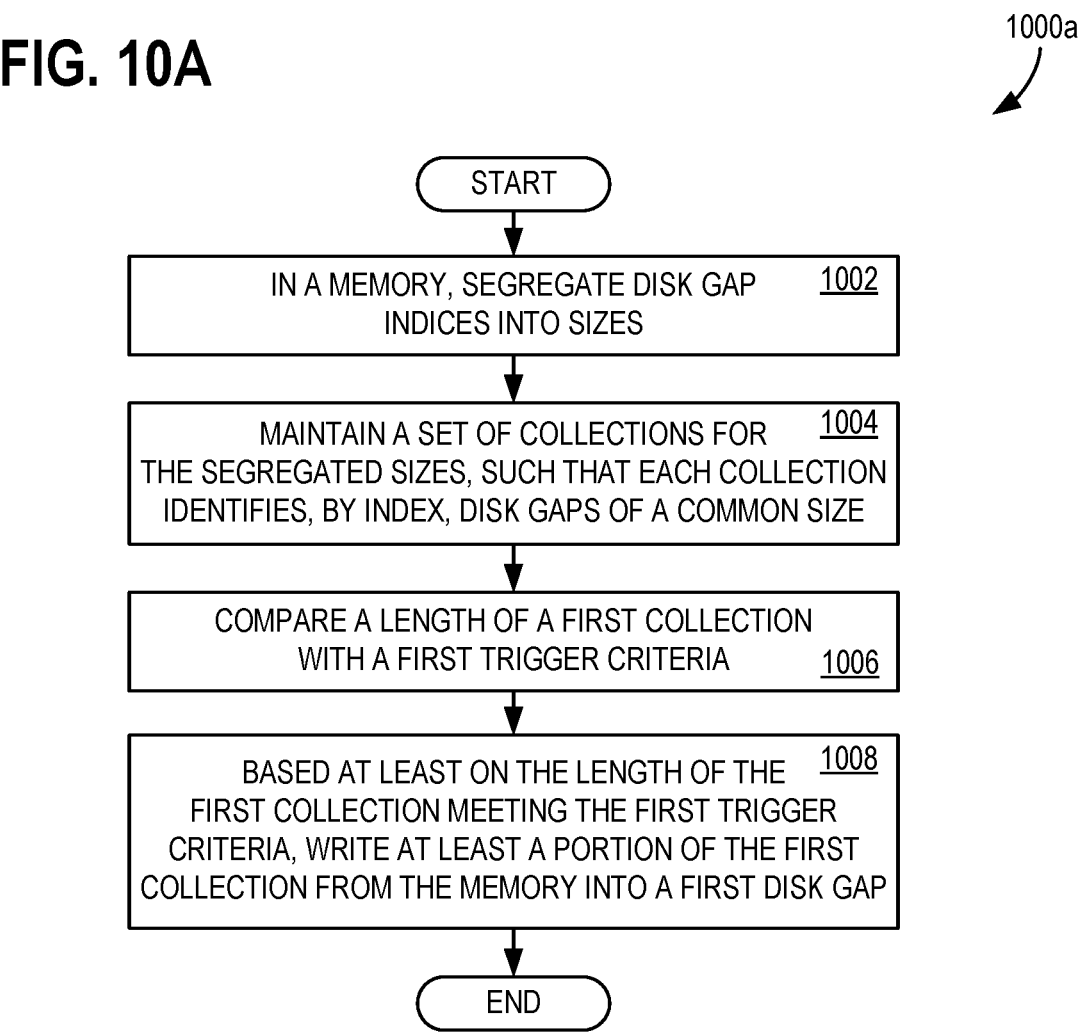
FIGS. 10A, 10B and 10C illustrates other flowcharts showing methods of gap management in block storage, according to example embodiments that may be used with the architecture of FIG. 1.

FIG. 10A illustrates a flowchart 1000*a* showing a method of gap management in block storage that may be used with architecture 100 of FIG. 1. Operation 1002 includes, in a memory, segregating disk gap indices by differentiated gap sizes. Operation 1004 includes maintaining a set of collections for the differentiated gap sizes, such that each collection identifies, by indices, disk gaps of a common size. Operation 1006 includes comparing a length of the first collection with a first trigger criteria. Operation 1008 includes based at least on the length of the first collection meeting the first trigger criteria, writing at least a portion of the first collection from the memory into a disk gap. Together, operations 1006 and 1008 constitute managing a first collection of the set of collections.

Figure 10B:
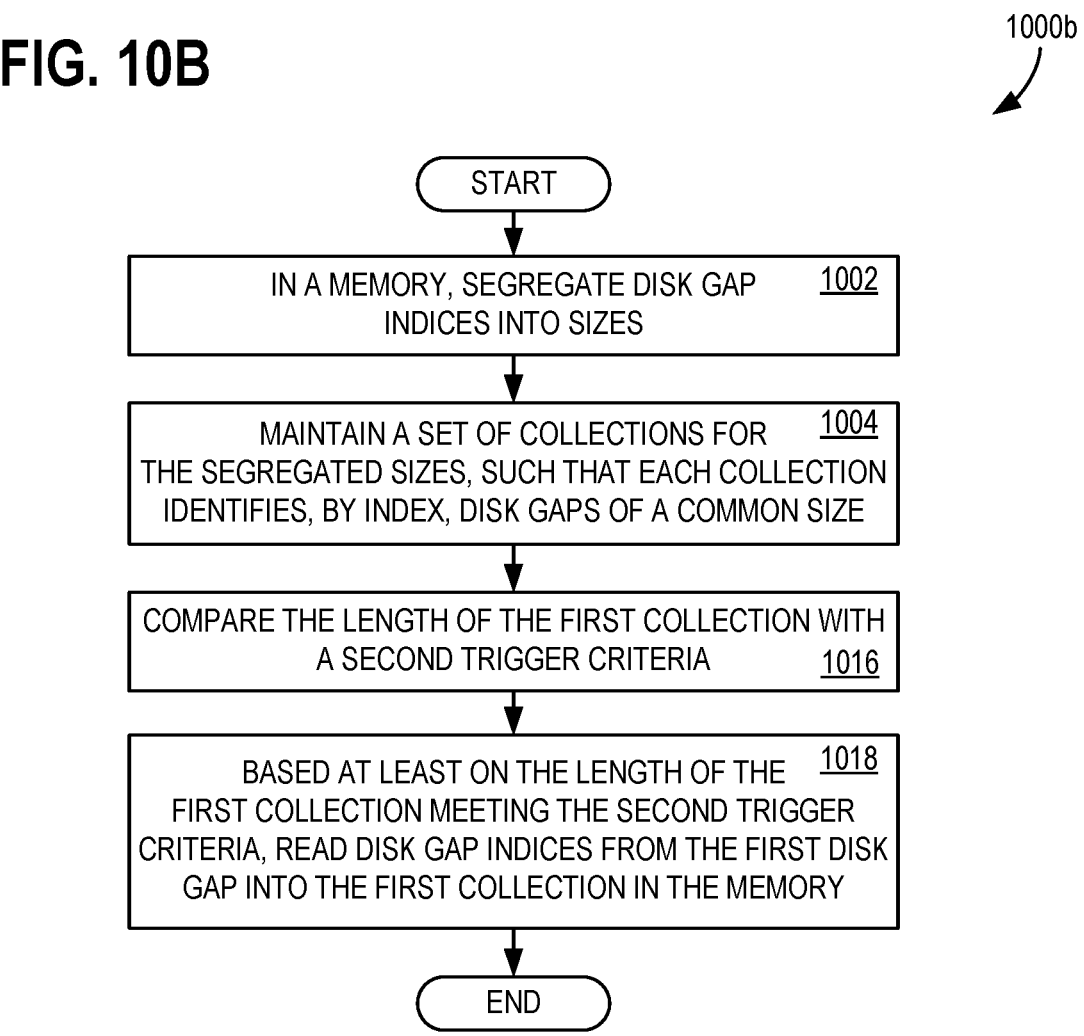

FIG. 10B illustrates a flowchart 1000*b* showing a method of gap management in block storage that may be used with architecture 100 of FIG. 1. Operations 1002 and 1004 occur as described for FIG. 10A. Operation 1016 includes comparing the length of the first collection with a second trigger criteria. Operation 1018 includes based at least on the length of the first collection meeting the second trigger criteria, reading disk gap indices from the disk gap into the first collection in the memory. Together, operations 1016 and 1018 constitute managing a first collection of the set of collections.

Figure 10C:
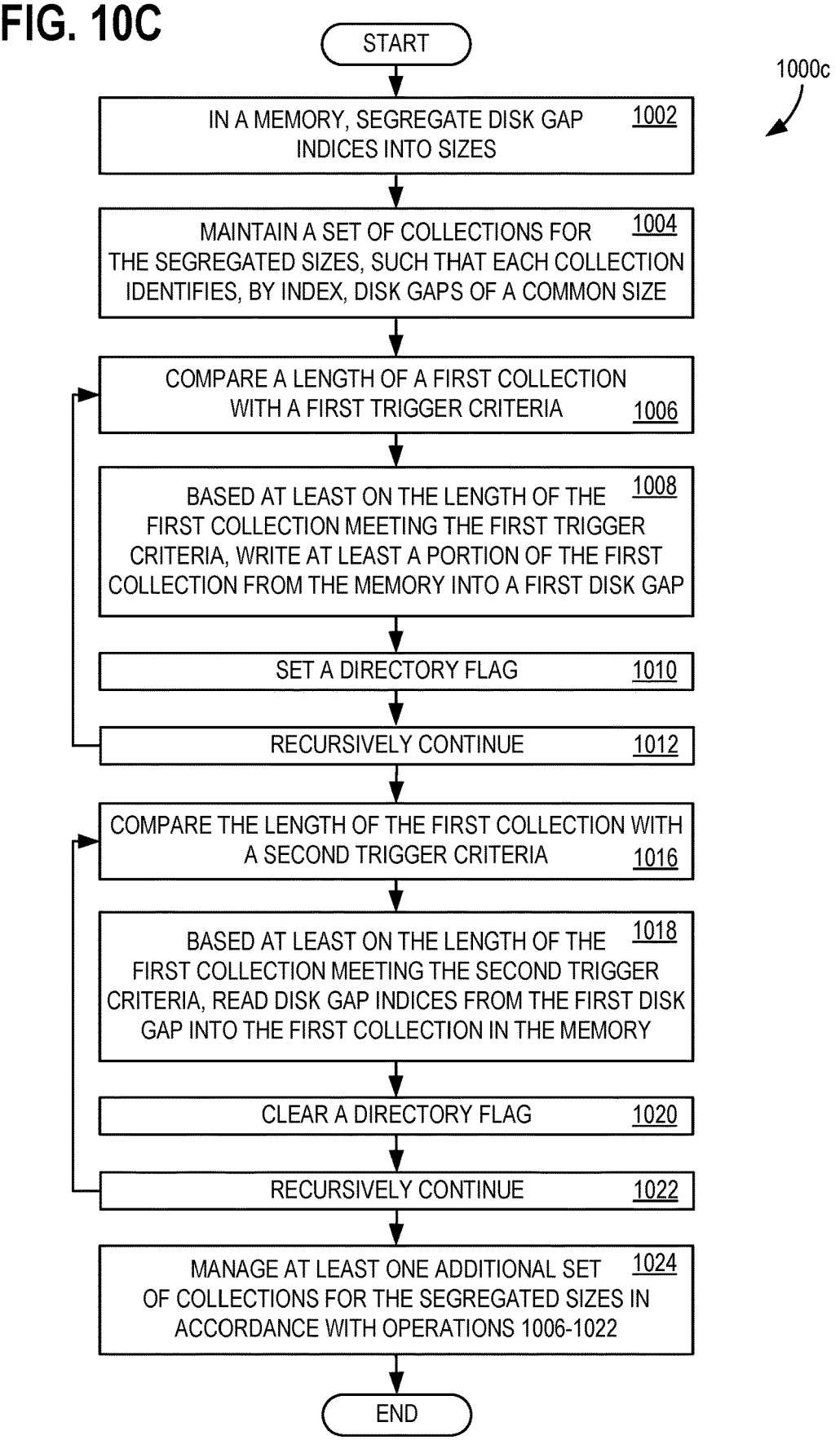

FIG. 10C illustrates a flowchart 1000*c* showing a method of gap management in block storage that may be used with architecture 100 of FIG. 1. Operations 1002-1008 occur as described for FIG. 10A. Operation 1010 includes setting a directory flag, and operation 1012 includes iteratively continuing operations 1006-1010. Operations 1016 and 1018 occur as described for FIG. 10B. Operation 1020 includes clearing a directory flag, and operation 1022 includes iteratively continuing operations 1016-1020. Together, operations 1006-1022 constitute managing a first collection of the set of collections. Operation 1024 includes managing at least one additional set of collections for the segregated sizes in accordance with operations 1006-1022. Thus, using flowchart 1000*c*, a plurality of gap sizes are managed.

Figure 11:
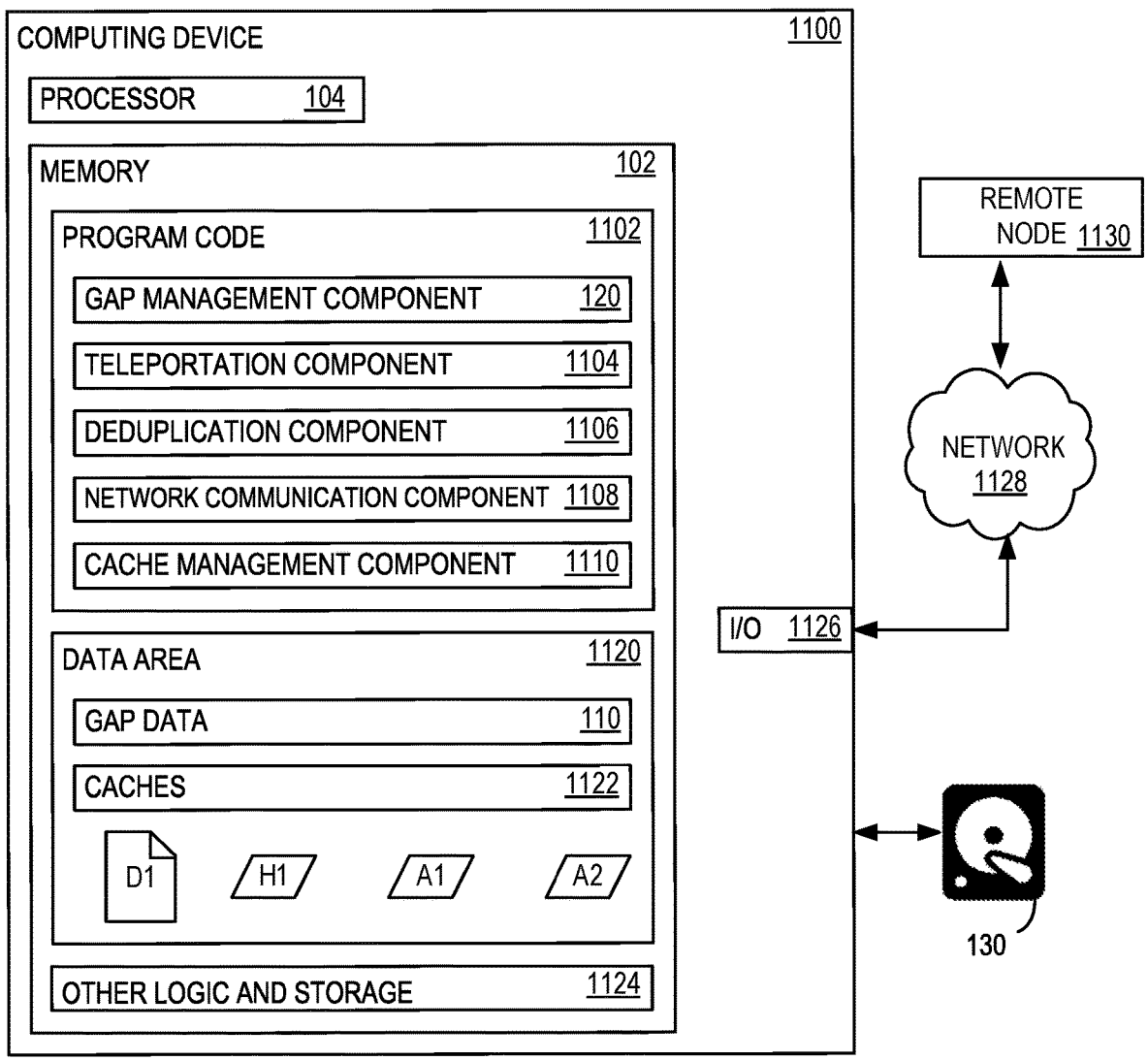
FIG. 11 illustrates a block diagram of a computing device that performs gap management in block storage, and that may be used with the architecture of FIG. 1, according to an example embodiment.

FIG. 11 illustrates a block diagram of a computing device 1100 that employs caching, and that may be used with architecture 100 of FIG. 1. The components of computing device 1100 operate in an unconventional manner to achieve the performance and benefits described herein. Computing device 1100 has at least one processor 104 and memory 102 that holds program code 1102, a data area 1120, and other logic and storage 1124. Processor 104 represents one or more processors, including parallel processors and multi-core processors. Memory 102 is any device allowing information, such as computer executable instructions and/or other data, to be stored and retrieved, for example, memory 102 may include one or more random access memory (RAM) modules. Program code 1102 comprises computer executable instructions, and computer executable components comprising gap management component 120, that performs operations described herein, and a teleportation component 1104 and a deduplication component 1106. Teleportation component 1104, for example, provides control of the various nodes illustrated in teleportation architecture 200 of FIG. 2, that advantageously uses gap management in block storage. As explained previously, deduplication operations, controlled by deduplication component 1106, can also advantageously use gap management in block storage.

Program code 1102 further comprises a network communication component 1108 and a cache management component 1110 that support operations in the architectures 100 and 200 of FIGS. 1 and 2, in support of deduplication, telecommunication, and other operations. The various component modules, 102, and 1104-1110 include code that is executed on and data that is operated upon by processor 104. Network communication component 1108 may be used when computing device 1100 is operating as any of source endpoint 222, destination endpoint 232, and teleporter 234. Cache management component 1110 may be used when computing device 1100 is operating as either of destination endpoint 232 and teleporter 234. Caches 1122 may hold any of short-term cache 236, long-term cache 238, and private cache 240. As illustrated, any of document D1, data hash value H1, block address A1, and block address A2, may be in data area 1120. Data area 1120 also holds gap data 110 that is used for gap management in block storage, as described herein, and caches 1122 (see, for examples FIG. 2 and its description).

An input/output (I/O) module 1126 permits communication over network 1128 to a remote node 1130, which may be another manifestation of computing device 1100. Disk module 130, shown as coupled to computing device 1100, may also represent any of source storage location 224, destination storage location 242 and destination storage location 244, and/or may hold any of private cache 240, short-term cache 236, and long-term cache 238.

Computing device 1100 represent any device executing instructions (e.g., as application programs, operating system functionality, or both) to implement the operations and functionality described herein. Computing device 1100 may include any portable or non-portable device including a mobile telephone, laptop, tablet, computing pad, netbook, gaming device, portable media player, desktop personal computer, kiosk, and/or tabletop device. Additionally, computing device 1100 may represent a group of processing units or other computing devices, such as in a cloud computing system or service. Processor 104 may include any quantity of processing units and may be programmed to execute any components of program code 1102 comprising computer executable instructions for implementing aspects of the disclosure. In some embodiments, processor 104 is programmed to execute instructions such as those illustrated in the figures.

Additional Examples

An exemplary method of gap management in block storage comprises: in a memory, segregating disk gap indices by differentiated gap sizes; maintaining a set of collections for the differentiated gap sizes, such that each collection identifies, by indices, disk gaps of a common size; and managing a first collection of the set of collections by: comparing a length of the first collection with a first trigger criteria; and based at least on the length of the first collection meeting the first trigger criteria, writing at least a portion of the first collection from the memory into a disk gap.

An exemplary computer system comprises: a processor; and a non-transitory computer readable medium having stored thereon program code for transferring data to another computer system, the program code causing the processor to: in a memory, segregate disk gap indices by differentiated gap sizes; maintain a set of collections for the differentiated gap sizes, such that each collection identifies, by indices, disk gaps of a common size; and manage a first collection of the set of collections by: compare a length of the first collection with a first trigger criteria; and based at least on the length of the first collection meeting the first trigger criteria, write at least a portion of the first collection from the memory into a disk gap.

An exemplary computer system for managing gaps in block storage comprises: a processor; a disk storage; and a memory comprising a computer-readable medium storing instructions that are operative when executed by the processor to: in a memory, segregate disk gap indices into sizes; maintain a set of collections for the segregated sizes, such that each collection identifies, by indices, disk gaps of a common size; and manage a first collection of the set of collections by: comparing a length of the first collection with a first trigger criteria; based at least on the length of the first collection meeting the first trigger criteria, writing at least a portion of the first collection from the memory into a disk gap; comparing the length of the first collection with a second trigger criteria; and based at least on the length of the first collection meeting the second trigger criteria, reading disk gap indices from the disk gap into the first collection in the memory; and manage a second collection of the set of collections in accordance with managing the first collection.

One or more exemplary non-transitory computer storage media having computer-executable instructions that, upon execution by a processor, cause the processor to at least perform operations that comprise: in a memory, segregating disk gap indices by differentiated gap sizes; maintaining a set of collections for the differentiated gap sizes, such that each collection identifies, by indices, disk gaps of a common size; and managing a first collection of the set of collections by: comparing a length of the first collection with a first trigger criteria; based at least on the length of the first collection meeting the first trigger criteria, writing at least a portion of the first collection from the memory into a disk gap; and managing a second collection of the set of collections in accordance with managing the first collection.

One or more exemplary non-transitory computer storage media having computer-executable instructions that, upon execution by a processor, cause the processor to at least perform operations that comprise: in a memory, segregating disk gap indices by differentiated gap sizes; maintaining a set of collections for the differentiated gap sizes, such that each collection identifies, by indices, disk gaps of a common size; and managing a first collection of the set of collections by: comparing a length of the first collection with a first trigger criteria; based at least on the length of the first collection meeting the first trigger criteria, writing at least a portion of the first collection from the memory into a disk gap, wherein the disk gap is identified by a disk gap index in a final list position within the portion of the first collection that is written; setting a first directory flag indicating that a copy of the disk gap index remaining within the memory comprises a first directory index, wherein the portion of the first collection that is written includes a second directory index in an initial list position within the portion of the first collection that is written; comparing the length of the first collection with a second trigger criteria; based at least on the length of the first collection meeting the second trigger criteria, reading disk gap indices from the disk gap into the first collection in the memory, wherein the disk gap is located for reading by a first directory index, and wherein the disk gap indices that are read from the disk gap include the second directory index; and clearing the first directory flag corresponding to the first directory index; and managing a second collection of the set of collections in accordance with managing the first collection.

Alternatively, or in addition to the other examples described herein, examples include any combination of the following:
- the disk gap is identified by a disk gap index within the portion of the first collection that is written;
- the disk gap index is in a final list position within the portion of the first collection that is written;
- setting a first directory flag indicating that a copy of the disk gap index remaining within the memory comprises a first directory index;
- the portion of the first collection that is written includes a second directory index;
- the second directory index is in an initial list position within the portion of the first collection that is written;
- iteratively comparing the length of the first collection with the first trigger criteria; based at least on the length of the first collection meeting the first trigger criteria, writing another portion of the first collection from the memory into another disk gap; and setting another directory flag;
- comparing the length of the first collection with a second trigger criteria; and based at least on the length of the first collection meeting the second trigger criteria, reading disk gap indices from the disk gap into the first collection in the memory;

the disk gap is located for reading by a first directory index, and wherein the method further comprises clearing a first directory flag corresponding to the first directory index;

the disk gap indices that are read from the disk gap include a second directory index;

the second directory index is in an initial list position within the disk gap indices that are read from the disk gap;

iteratively comparing the length of the first collection with the second trigger criteria; based at least on the length of the first collection meeting the second trigger criteria, reading disk gap indices from another disk gap into the first collection in the memory; and clearing another directory flag;

managing a second collection of the set of collections in accordance with managing the first collection;

collecting disk gap metric data; and adjusting at least one parameter selected from the list consisting of memory allocated for a collection, trigger criteria, and size class criteria;

the first collection comprises a size class that includes a plurality of size lists; and the memory and the disk storage are located in separate nodes.

Exemplary Operating Environment

The operations described herein may be performed by a computer or computing device. The computing devices comprise processors and computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The examples illustrated and described herein as well as examples not specifically described herein but within the scope of aspects of the invention constitute exemplary means for gap management in block storage. For example, the elements illustrated in the figures, such as when encoded to perform the operations illustrated in the figures, constitute exemplary means for segregating disk gap indices by differentiated gap sizes; exemplary means for maintaining a set of collections for the differentiated gap sizes such that each collection identifies, by indices, disk gaps of a common size; and exemplary means for managing a first collection of the set of collections by comparing a length of the first collection with a first trigger criteria, and, based at least on the length of the first collection meeting the first trigger criteria, writing at least a portion of the first collection from the memory into a disk gap.

The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Some examples herein are described as performing certain operations via "iteration," "iterative computing," and other variations of such language. Iteration refers to repeatedly performing the same operation or set of operations upon each object in a set of objects until the operation or set of operations has been performed upon every object in the set of objects. It should be understood that, unless explicitly stated otherwise, iteration over a set of objects can be done either sequentially (e.g.: operate on A; then B; then C; then D) or concurrently (e.g.: operate on A and B simultaneously; then operate on C and D simultaneously). Concurrent iteration can process as many objects at once as an example operating environment practicably allows.

Sequential iteration is most suitable to examples where only a single processor is available to perform operations and/or the computing environment does not support multi-threaded computation. Concurrent iteration is most suitable to examples where more than one processor is available to perform operations and/or the computing environment does support multi-threaded (also referred to as parallel) computation. Concurrent iteration exhibits considerable performance advantages over sequential iteration, especially when working with large data sets.

Examples are given herein, in both this Detailed Description and the Drawings, utilizing sequential iteration so that the Detailed Description and Drawings facilitate both full understanding of the disclosure and the greatest possible clarity. No portion of this disclosure expresses, nor is any portion of this disclosure intended to express, that only sequential iteration or concurrent iteration is usable for any particular instance of iteration herein. The use of sequential iteration in the Drawings does not express a preference for sequential iteration over concurrent iteration. No such preference exists—examples of the disclosure should implement whatever type of iteration is most suited to the example's intended application.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of gap management in block storage, the method comprising:
    in a memory, segregating disk gap indices by differentiated gap sizes;
    maintaining a set of collections for the differentiated gap sizes, such that each collection identifies, by indices, disk gaps of a common size; and
    managing a first collection of the set of collections by:
        comparing a length of the first collection with a first trigger criteria; and
        based at least on the length of the first collection meeting the first trigger criteria, writing at least a portion of the first collection from the memory into one of the disk gaps.

2. The method of claim 1, wherein the one of the disk gaps is identified by a first disk gap index in a final list position within the portion of the first collection that is written.

3. The method of claim 2, further comprising:
    setting a first directory flag indicating that a copy of the first disk gap index remaining within the memory comprises a first directory index.

4. The method of claim 3, wherein the portion of the first collection that is written includes a second directory index in an initial list position within the portion of the first collection that is written.

5. The method of claim 4, further comprising:
    iteratively:
        comparing the length of the first collection with the first trigger criteria;
        based at least on the length of the first collection meeting the first trigger criteria, writing another portion of the first collection from the memory into another disk gap; and
        setting another directory flag.

6. The method of claim 3, further comprising:
    comparing the length of the first collection with a second trigger criteria; and
    based at least on the length of the first collection meeting the second trigger criteria, reading disk gap indices from the one of the disk gaps into the first collection in the memory; and
    clearing the first directory flag corresponding to the first directory index.

7. The method of claim 1, further comprising:
    managing a second collection of the set of collections in accordance with managing the first collection.

8. A computer system comprising:
    a processor; and
    a non-transitory computer readable medium having stored thereon program code for transferring data to another computer system, the program code causing the processor to:
        in a memory, segregate disk gap indices by differentiated gap sizes;
        maintain a set of collections for the differentiated gap sizes, such that each collection identifies, by indices, disk gaps of a common size; and
        manage a first collection of the set of collections by:
            compare a length of the first collection with a first trigger criteria; and
            based at least on the length of the first collection meeting the first trigger criteria, write at least a portion of the first collection from the memory into one of the disk gaps.

9. The system of claim 8, wherein the one of the disk gaps is identified by a first disk gap index in a final list position within the portion of the first collection that is written.

10. The system of claim 9, wherein the code further causes the processor to:
set a first directory flag indicating that a copy of the first disk gap index remaining within the memory comprises a first directory index.

11. The system of claim 10, wherein the portion of the first collection that is written includes a second directory index in an initial list position within the portion of the first collection that is written.

12. The system of claim 11, wherein the code further causes the processor to:
iteratively:
compare the length of the first collection with the first trigger criteria;
based at least on the length of the first collection meeting the first trigger criteria, write another portion of the first collection from the memory into another disk gap; and
set another directory flag.

13. The system of claim 10, wherein the code further causes the processor to:
compare the length of the first collection with a second trigger criteria; and
based at least on the length of the first collection meeting the second trigger criteria, read disk gap indices from the one of the disk gaps into the first collection in the memory; and
clear the first directory flag corresponding to the first directory index.

14. The system of claim 8, wherein the code further causes the processor to:
managing a second collection of the set of collections in accordance with managing the first collection.

15. A non-transitory computer storage medium having computer-executable instructions that, upon execution by a processor, cause the processor to at least perform operations to manage gaps in block storage, the operations comprising:
in a memory, segregating disk gap indices by differentiated gap sizes;
maintaining a set of collections for the differentiated gap sizes, such that each collection identifies, by indices, disk gaps of a common size; and
managing a first collection of the set of collections by:
comparing a length of the first collection with a first trigger criteria;
based at least on the length of the first collection meeting the first trigger criteria, writing at least a portion of the first collection from the memory into a one of the disk gaps; and
managing a second collection of the set of collections in accordance with managing the first collection.

16. The non-transitory computer storage medium of claim 15, wherein the one of the disk gaps is identified by a first disk gap index in a final list position within the portion of the first collection that is written.

17. The non-transitory computer storage medium of claim 16, wherein the operations further comprise:
setting a first directory flag indicating that a copy of the first disk gap index remaining within the memory comprises a first directory index.

18. The non-transitory computer storage medium of claim 17, wherein the portion of the first collection that is written includes a second directory index in an initial list position within the portion of the first collection that is written.

19. The non-transitory computer storage medium of claim 18, wherein the operations further comprise:
iteratively:
comparing the length of the first collection with the first trigger criteria;
based at least on the length of the first collection meeting the first trigger criteria, writing another portion of the first collection from the memory into another disk gap; and
setting another directory flag.

20. The non-transitory computer storage medium of claim 17, wherein the operations further comprise:
comparing the length of the first collection with a second trigger criteria; and
based at least on the length of the first collection meeting the second trigger criteria, reading disk gap indices from the one of the disk gaps into the first collection in the memory; and
clearing the first directory flag corresponding to the first directory index.

* * * * *